(12) United States Patent
Shawver

(10) Patent No.: US 9,395,040 B1
(45) Date of Patent: Jul. 19, 2016

(54) VIBRATION CANCELLING PLATFORM FOR USE WITH LAPTOPS OR TABLE COMPUTERS USED IN MOVING VEHICLES

(71) Applicant: Michael Shawver, Mill Valley, CA (US)

(72) Inventor: Michael Shawver, Mill Valley, CA (US)

( * ) Notice: Subject to any disclaimer, the term of this patent is extended or adjusted under 35 U.S.C. 154(b) by 0 days.

(21) Appl. No.: 14/508,545

(22) Filed: Oct. 7, 2014

(51) Int. Cl.
*A47B 37/00* (2006.01)
*F16M 13/02* (2006.01)

(52) U.S. Cl.
CPC ..................... *F16M 13/02* (2013.01)

(58) Field of Classification Search
CPC ....................................................... A47B 11/00
USPC ........... 108/94, 103, 104; 361/679.46–679.55
See application file for complete search history.

(56) References Cited

U.S. PATENT DOCUMENTS

| | | | |
|---|---|---|---|
| 2,830,862 A * | 4/1958 | Wright ...................... | A47F 5/02 108/104 |
| 3,541,976 A | 11/1970 | Rozas | |
| 3,922,973 A | 12/1975 | Sturgeon | |
| 5,379,990 A | 1/1995 | Ando et al. | |
| 5,553,824 A | 9/1996 | Dutra | |
| 5,553,834 A | 9/1996 | Je | |
| 6,239,971 B1 * | 5/2001 | Yu ........................... | G06F 1/203 165/104.33 |
| 6,426,935 B1 | 7/2002 | Imai et al. | |
| 6,682,038 B2 * | 1/2004 | Golynsky ........... | A47B 21/0314 108/43 |
| 6,719,258 B2 * | 4/2004 | Bryngelson ............ | B60N 2/502 248/419 |
| 7,038,909 B1 | 5/2006 | Chen | |
| 8,371,237 B2 | 2/2013 | Weber | |
| 8,474,778 B2 | 7/2013 | Jacobson | |
| 2012/0248049 A1 | 10/2012 | Moore | |

\* cited by examiner

*Primary Examiner* — Matthew Ing
(74) *Attorney, Agent, or Firm* — Steven A. Nielsen; www.NielsenPatents.com

(57) ABSTRACT

Use of a laptop, tablet or other electronic device within a vehicle or other mode of transportation is often made difficult due to vibration, bumps and sudden turns. A vibration cancelling platform provides stabilization to an electronic device used during transportation. A platform may be comprised of a top housing and a bottom housing which may slide laterally relative to each other in order to stabilize a user's electronic device resting upon the top housing. Low friction sliding components such as rollers, bearing or other components help to reduce or prevent the environmental movement experienced by the bottom housing from being transmitted to the upper housing. Spring elements secured between the top and bottom housings further assist in reducing vibration and act to stabilize the top housing in a centralized position. Optional mouse pads extend from the platform by use of specially configured low friction sliding mechanisms.

14 Claims, 15 Drawing Sheets

VIBRATION CANCELLING PLATFORM FOR USE WITH LAPTOPS OR TABLE COMPUTERS USED IN MOVING VEHICLES

BACKGROUND OF THE INVENTION (1) Field of the Invention

The invention generally relates to vibration cancelling systems. More particularly, the invention relates to the manufacture and use of stabilization systems to facilitate the use of portable electronics by consumers while in transit.

(2) Description of the Related Art

Other portable desk or support systems are known. For example, U.S. Pat. No. 3,541,976 issued to Rozas on Nov. 24, 1970 discloses a portable desk attached to a user's neck and torso. U.S. Pat. No. 3,922,973 issued to Sturgeon on Dec. 2, 1975 discloses a desk for use in vehicles, the desk having a swivel for rotation.

U.S. Pat. No. 5,379,990 issued to Ando et al on Jan. 10, 1995 discloses the use of springs or resilient members to dampen the movement of a chassis attached to a housing. Ando fails to disclose or contemplate any form of free sliding movement.

U.S. Pat. No. 6,719,258 issued to Bryngelson et al on Apr. 13, 2004 discloses a pivot linkage assembly and air spring assembly in a car seat system. The structure of Bryngelson is unartful and not practical for use with portable electronic devices.

U.S. Pat. No. 8,480,052 issued to Taylor et al on Jul. 9, 2013 discloses a vibration isolating device using vertical springs only.

BRIEF SUMMARY OF THE INVENTION

Using a laptop computer or other device while traveling may be challenging due to vibrations, shaking, turns and bumps that are typically encountered while riding in cars, buses, RVs, trains, airplanes and other modes of transportation. More specifically, a table mounted to a moving vehicle may act as a cantilever and amplify vibrations to laptop computer sitting upon the table. Whether resting upon a table or a user's lap, a laptop computer is typically subjected to unpleasant movement that hinders the use of the computer and concentration of the user. In many modes of transportation it is nearly impossible to view a laptop screen and use a keyboard and mouse due to the abrupt accelerations, decelerations, vibrations and other movements.

The presently disclosed embodiments solve long felt shortfalls in the art by presenting an unobvious and unique combination, configuration and use of components to provide a portable vibration canceling platform for use with laptop computers and other devices used in mobile environments. Disclosed embodiments mitigate and/or cancel vibrations or shaking that typically occurs to computers used upon tables mounted to a vehicle.

The presently disclosed embodiments overcome shortfalls in the art by presenting a new platform or device that comprises a bottom housing artfully connected to a top housing such that the two housings enjoy nearly unrestricted lateral motion with respect to one another. Shortfalls in the art are further overcome by use of centering components, such as springs and elastic members that gently return the top housing to a neutral position and absorb movement transmitted to the bottom housing. Optional extendable mouse pads further add to the utility of the disclosed embodiments.

Embodiments include the use of rollers, roller support journals, bumpers, springs or elastic members and other components advantageously configured.

An alternative embodiment roller journals are replaced by rollers, with the rollers in direct rolling contact with the underside of a top housing and top side of a bottom housing. An especially compact design is achieved by use of guide plate that guides and separates the rollers in lieu of a cage and race configuration.

Figure 1:
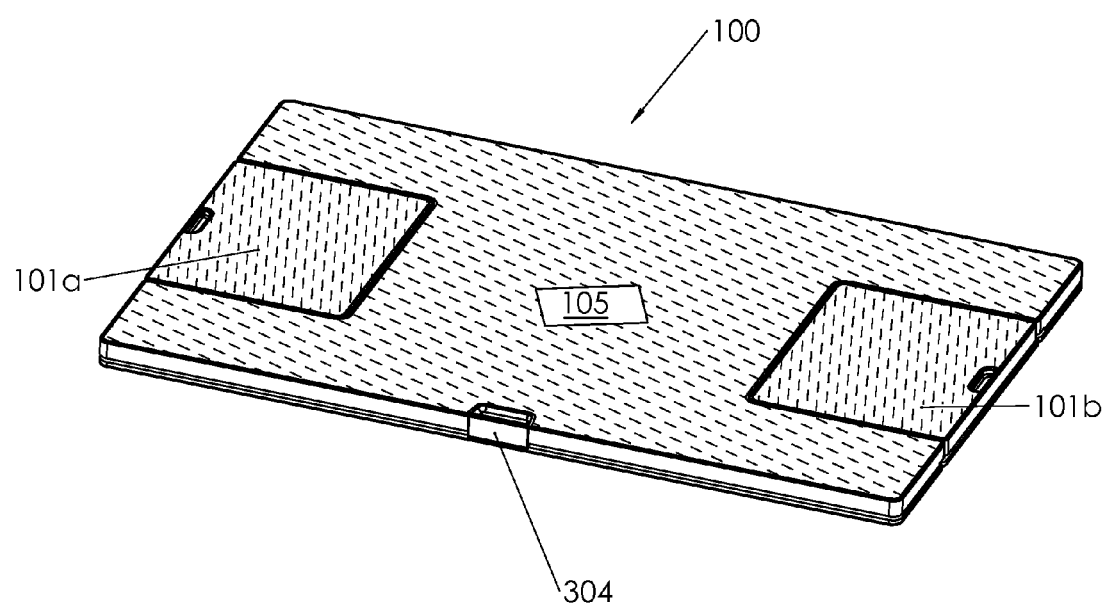
FIG. 1 depicts a top view of a platform with the mouse pads retracted.

REFERENCE NUMERALS IN THE DRAWINGS 50 laptop computer or other device
51 computer mouse
52 mobile phone
100 platform
101a extendable mouse pad—right side 101b extendable mouse pad—left side
102 detachable mouse pad
105 top surface of platform 100
200 platform top housing assembly
201 platform top housing
202 roller
203 mouse pad top housing
204(a-b) mouse pad anti-slip pad
205 platform anti-slip pad
206 spring
207 lateral guide bearing
208 end of travel stop surface
209 roller support journal
210a spring anchor point of top housing—right side
210b spring anchor point of top housing—left side
211 platform top housing
220 lateral track
221 mouse pad lateral track
225 lateral bearing race pin
300 platform bottom housing assembly
301 platform bottom housing
302a mouse pad bottom housing
302b mouse pad bottom housing
303(a-b) stiffener plate
304 locking latch
305 foot pad
306 stop bumper
307(a-b) spring anchor
308 ball bearing slide
309 adjustable spring anchor
311 roller guide
312 free roller
320 center plane section of platform bottom housing 301
321 rail plane section of platform bottom housing 301
322 stiffener rib
335 mouse skirt
337 stiffener of mouse skirt 335
350 free roller void
400 vehicle mounted table
500 directional arrow- to the left
501 directional arrow—to the right
502 directional arrow—to the right and left
503 directional arrow—in, toward the body of the platform
504 directional arrow—out, away from the body of the platform
510 directional arrow—to the right to increase spring tension
515 directional arrow—to the left to decrease spring tension These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Referring to FIG. 1, a platform 100 for mounting or supporting a laptop computer, tablet computer or other device is depicted with integrated extendable mouse pads 101a and 101b and a locking latch 304. A platform 100 may comprise a top surface 105 used to support a laptop computer, tablet computer or other device.

Figure 2:
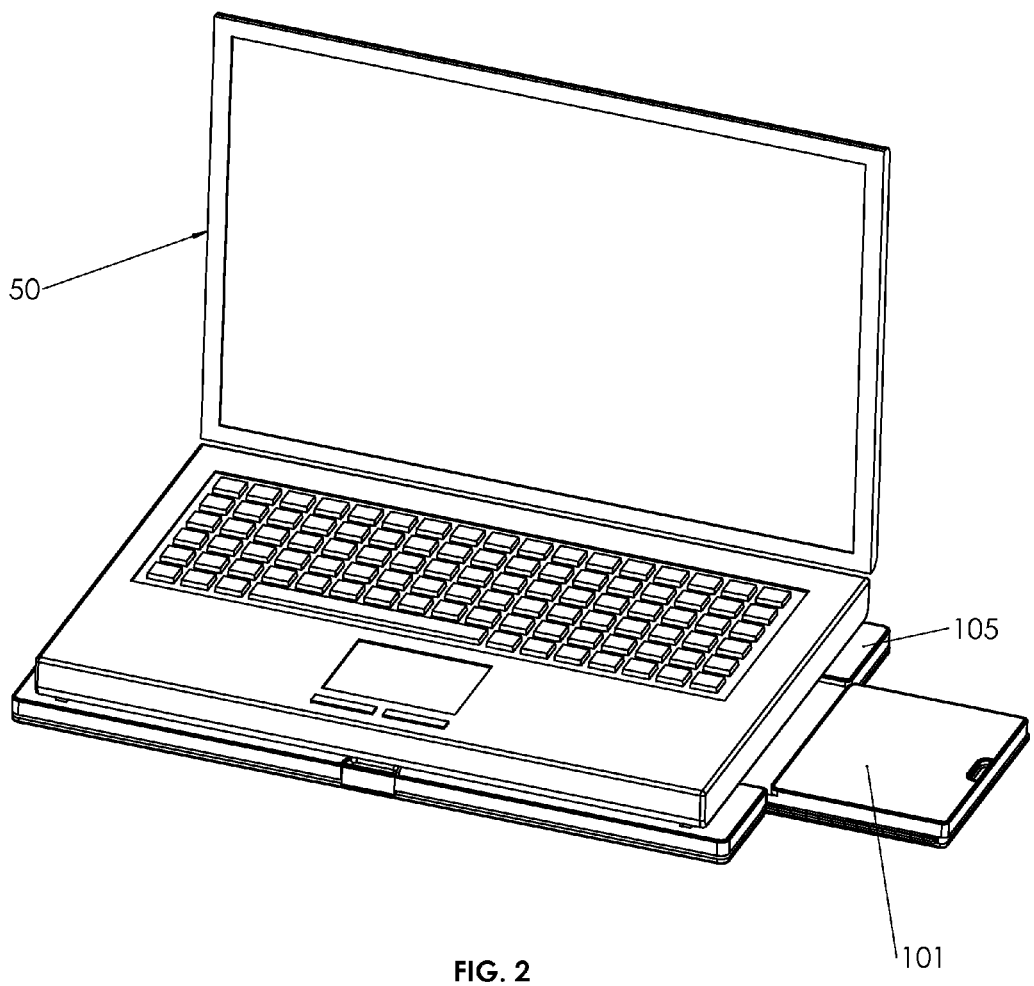
FIG. 2 depicts a top perspective view of a laptop resting upon a platform.

FIG. 2 depicts a platform 100 with a laptop 50 resting on the top surface 105 of the platform and with the right integrated mouse pad 101 in an extended position.

Figure 3:
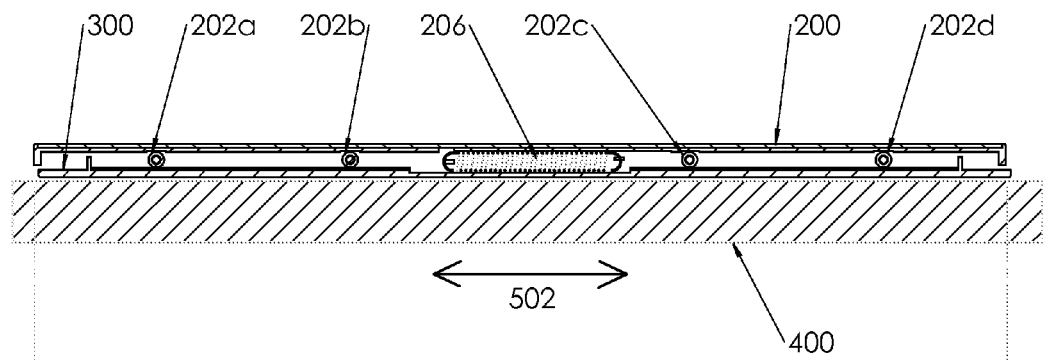
FIG. 3 depicts is a front cross sectional view of a platform resting upon a vehicle mounted table.

FIG. 3 depicts a front cross sectional view of a platform 100 and shows the top housing assembly 200 with mounted rollers 202(a-c) resting on the bottom housing 300. The platform is show resting on a table 400, wherein the table 400 is mounted in a vehicle, such as a bus. The table 400, will vibrate left to right as the vehicle moves along the road. The rollers 202(a-c) enable low friction lateral movement between the top housing assembly 200 and the bottom housing assembly 300. Directional arrow 502 indicates that the bottom housing may move left or right in reference to the top housing.

Also shown is one of the two springs 206 or resilient members being anchored to the top housing assembly at one end and the bottom housing assembly at the other end. The two springs 206 are used for stabilizing the top housing, and thus laptop or tablet, in a steady position relative to earth and the user as the bottom housing, which is resting on the table mounted in a vehicle, is shaking or vibrating left to right. The preferred embodiment displays springs 206 as extension springs, but the springs may also be compression or leaf springs or any other resilient component.

Figure 4:
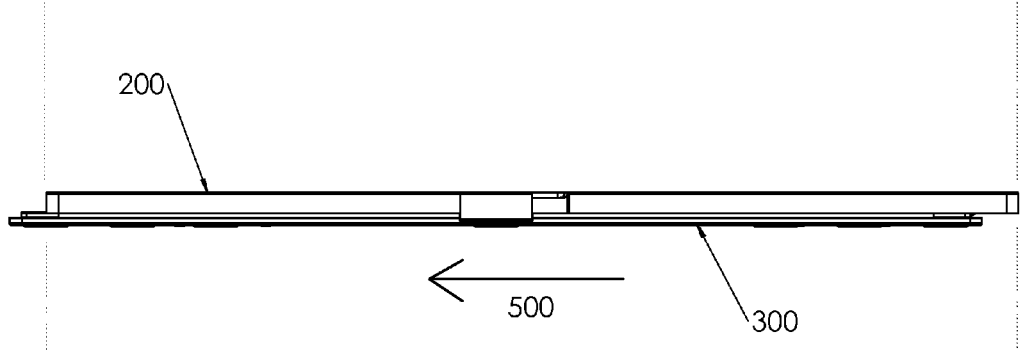
FIG. 4 depicts a front view of the platform showing the bottom housing moved to the left.

FIG. 4 depicts a bottom housing assembly 300 shifted to the left as the top housing assembly 200 maintains a steady position.

Figure 5:
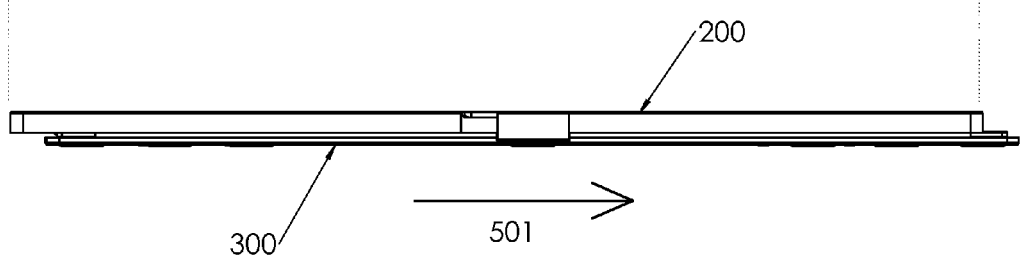
FIG. 5 depicts a front view of the platform showing the bottom housing moved to the right.

FIG. 5 depicts the bottom housing assembly 300 shifted to the right as the top housing assembly 200 maintains a steady position.

Figure 6:
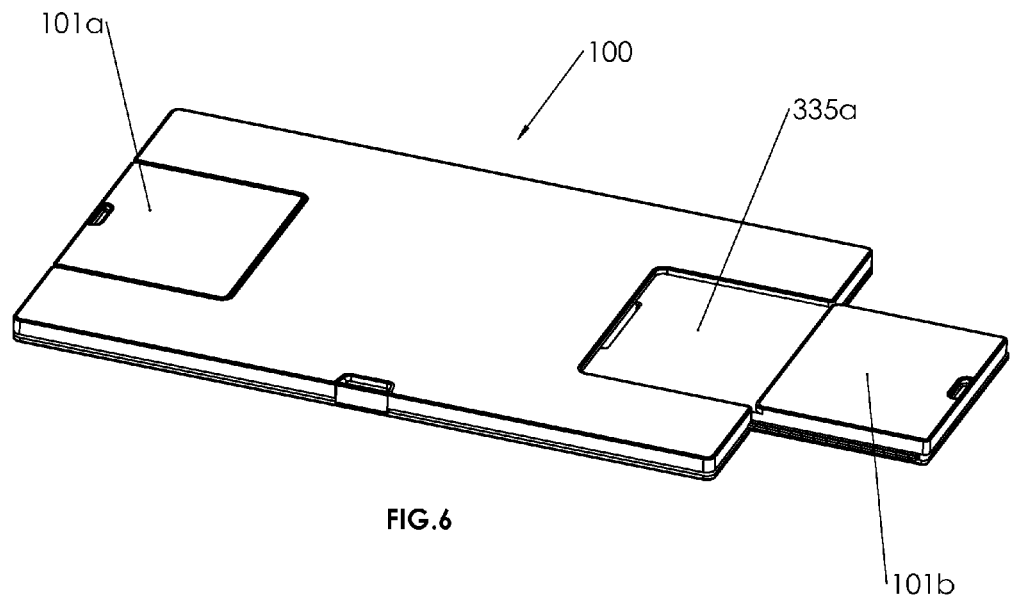
FIG. 6 depicts a top perspective view of a platform with a right mouse pad extended.

FIG. 6 depicts the platform 100 and the right side extendable mouse pad 101b pulled out for use with a computer mouse, the computer mouse not shown.

Figure 7:
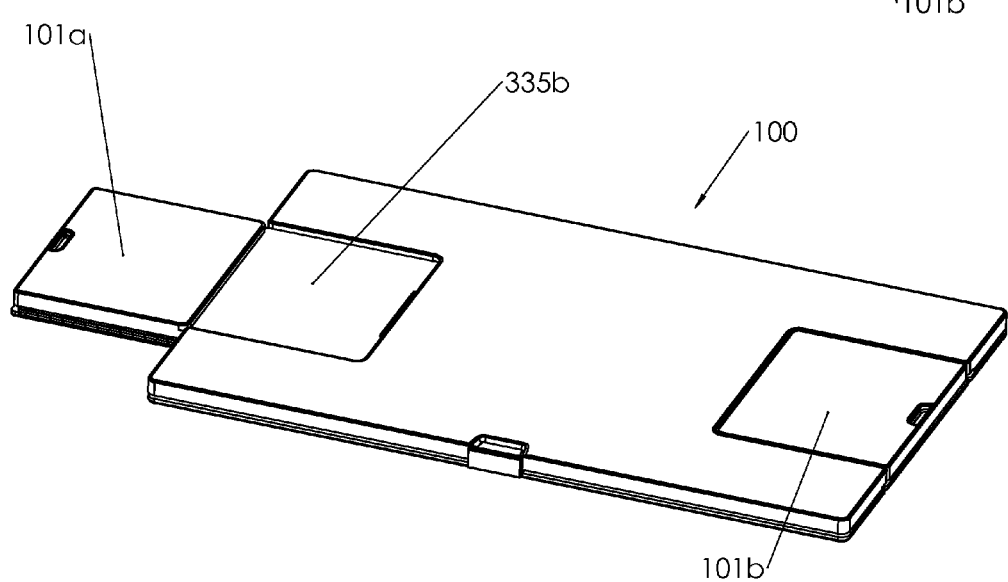
FIG. 7 depicts a top perspective view of a platform with a left mouse pad extended.

FIG. 7 depicts the platform 100 and the left side extendable mouse pad 100a pulled out for use with a computer mouse, the computer mouse not shown.

Figure 8:
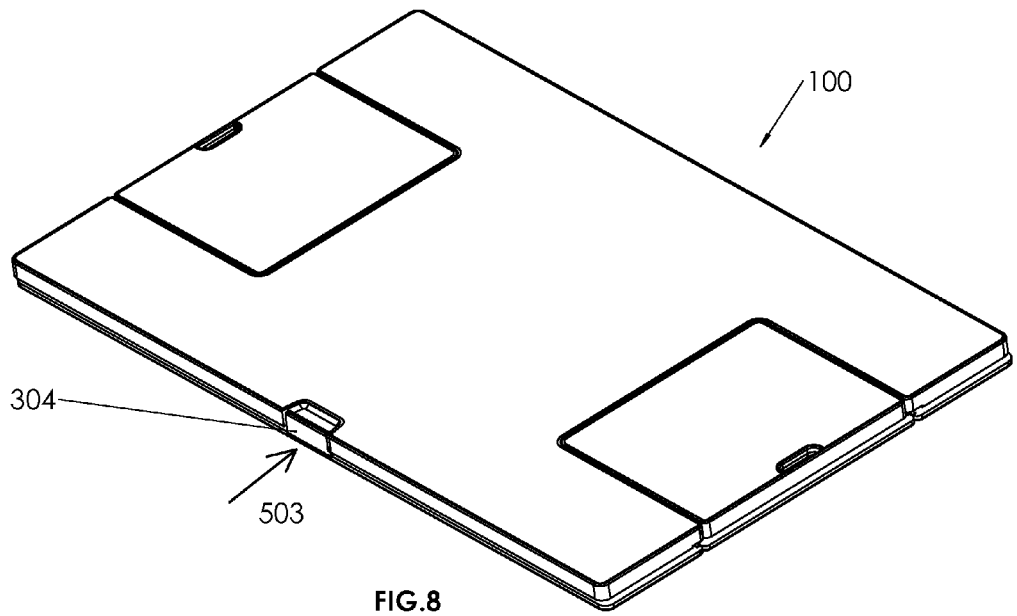
FIG. 8 depicts a top perspective view of a platform with a locking latch in a locked position.

FIG. 8 depicts a platform 100 and a locking latch 304 in the locked position. The latch locks the top housing assembly 200 to the bottom housing assembly 300. This feature is useful for stowing and carrying the platform and for momentarily turning off the anti-vibration feature while the laptop or tablet are not in use in the vehicle. Directional arrow 503 indicates that the locking latch has been moved to an inward position.

Figure 9:
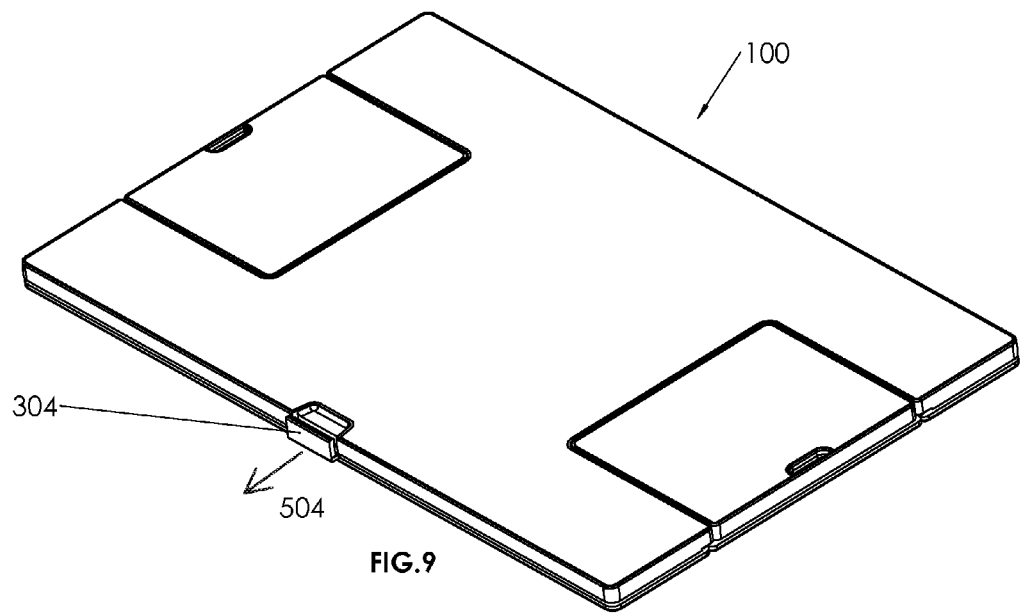
FIG. 9 depicts a top perspective view of a platform with a locking latch in an unlocked position.

FIG. 9 depicts the platform 100 and the locking latch 304 in the unlocked position. This allows the top housing assembly to laterally articulate relative to the bottom housing assembly. Directional arrow 504 indicates that the locking latch has been moved to an outward position.

Figure 10:
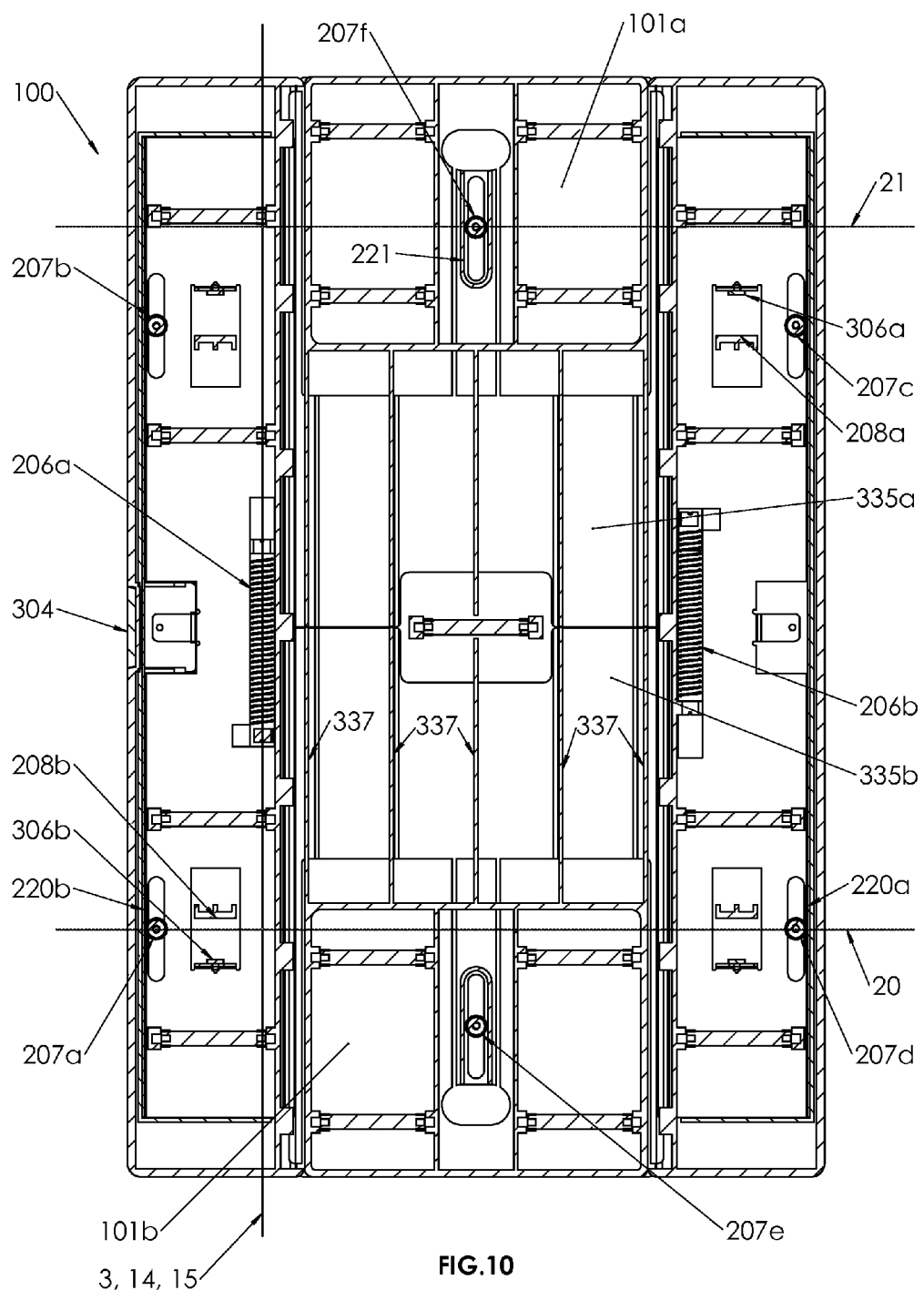
FIG. 10 depicts a top cross sectional view showing rollers, springs and stop bumpers.

FIG. 10 depicts a top cross sectional view of a platform 100 and mouse pads 101a and 101b. This view shows a plurality rollers 202(a-c) and two stabilizing springs 206. Stabilizing springs may be made of any resilient material. Also shown are four bumpers 306 and four end of travel stop surfaces 208. The bumpers 306 provide a cushioned stop for the end of travel of the top housing assembly to the left and right. The bumpers 306 are needed for large momentary vibrations from the vehicle and for hard right and left turns of the vehicle.

FIG. 10 further depicts each of the two springs 206(a-b) having a first end attached to the upper housing and a second end attached to the lower housing. A plurality of rollers 202 assist in the support and free sliding between the mouse pad top housing 203 and the mouse pad bottom housing 302.

FIG. 10 further depicts locking latch 304, lateral guide bearings 207, lateral tracks 220, stiffeners 337 of a mouse skirt and other components.

Figure 11:
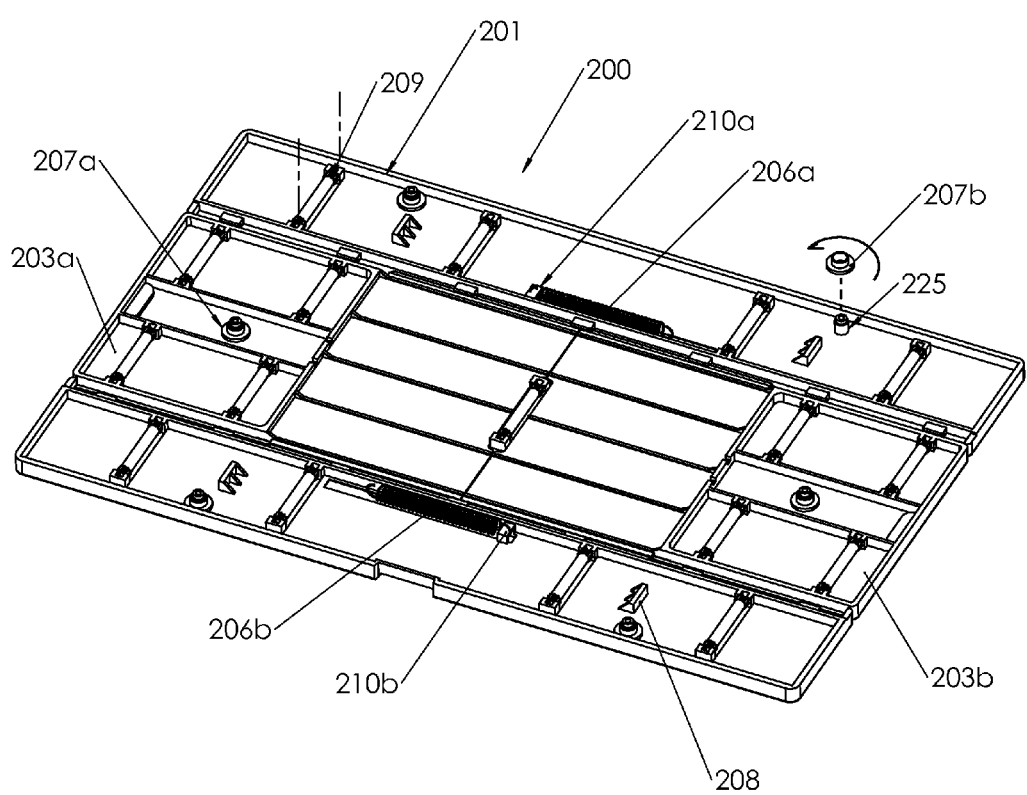
FIG. 11 depicts an interior perspective view of a top housing assembly.

FIG. 11 depicts a perspective view of the inside of a top housing assembly 200. Platform top housing 201 is shown as well as mouse pad top housings 203a and 203b of extendable mouse pads 101. The mouse pad top housings 203 are slide-ably mounted in the top housing 201. Rollers 202 are mounted in roller support journals 209 in the top housing and in the mouse pad top housings. Lateral guide bearings 207 are shown and these provide low friction guidance in the fore and aft directions between the top housing assembly 200 and the bottom housing assembly 300. The springs 206a and 206b are shown with each end anchored respectively at anchor points 210a and 210b on the top housing 201.

Figure 12:
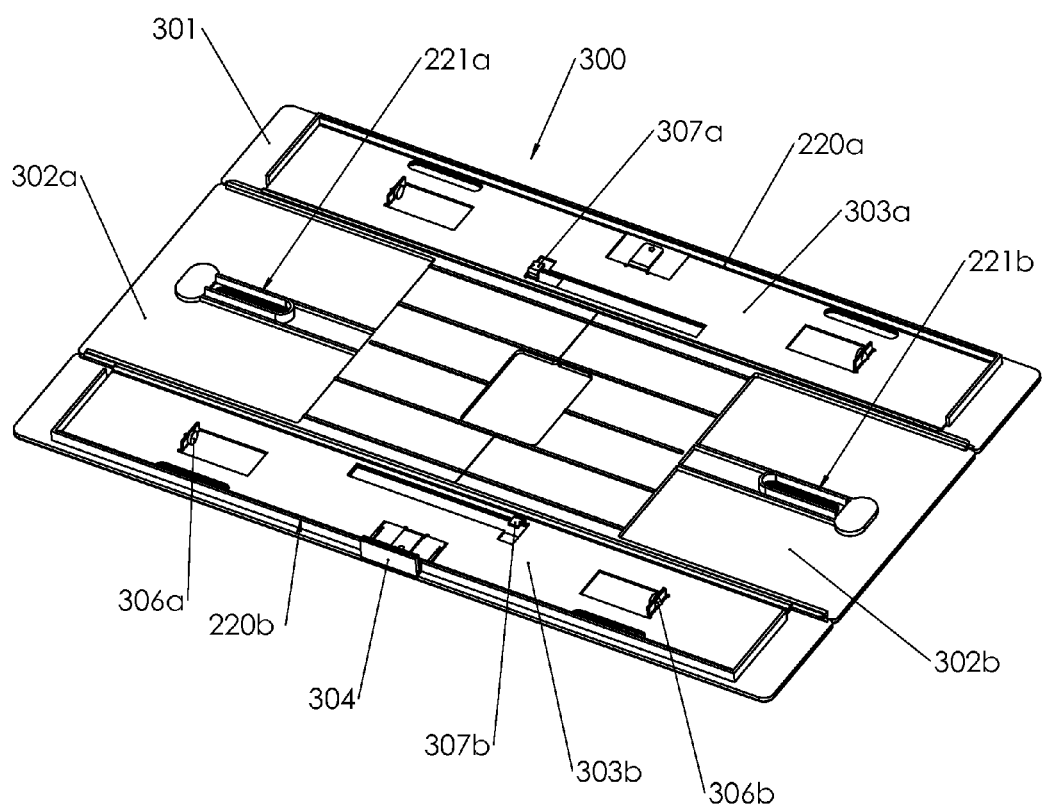
FIG. 12 depicts an interior perspective view of a bottom housing assembly.

FIG. 12 depicts an inside perspective view of a bottom housing assembly 300. Platform bottom housing 301 is shown as well as mouse pad bottom housings 302a and 302b of extendable the mouse pads. The mouse pad bottom housings 302a and 302b are slide-ably mounted in the bottom housing 301. Bumpers 306(a-b) are shown as well as locking latch 304. Stiffener plates 303a and 303b provide stiffness to the bottom housing assembly as well as capture and mounting features for the mouse pad housings 302a and 302b, locking latch 304, bumpers 306 and spring 206 anchor points 307a and 307b.

Figure 13:
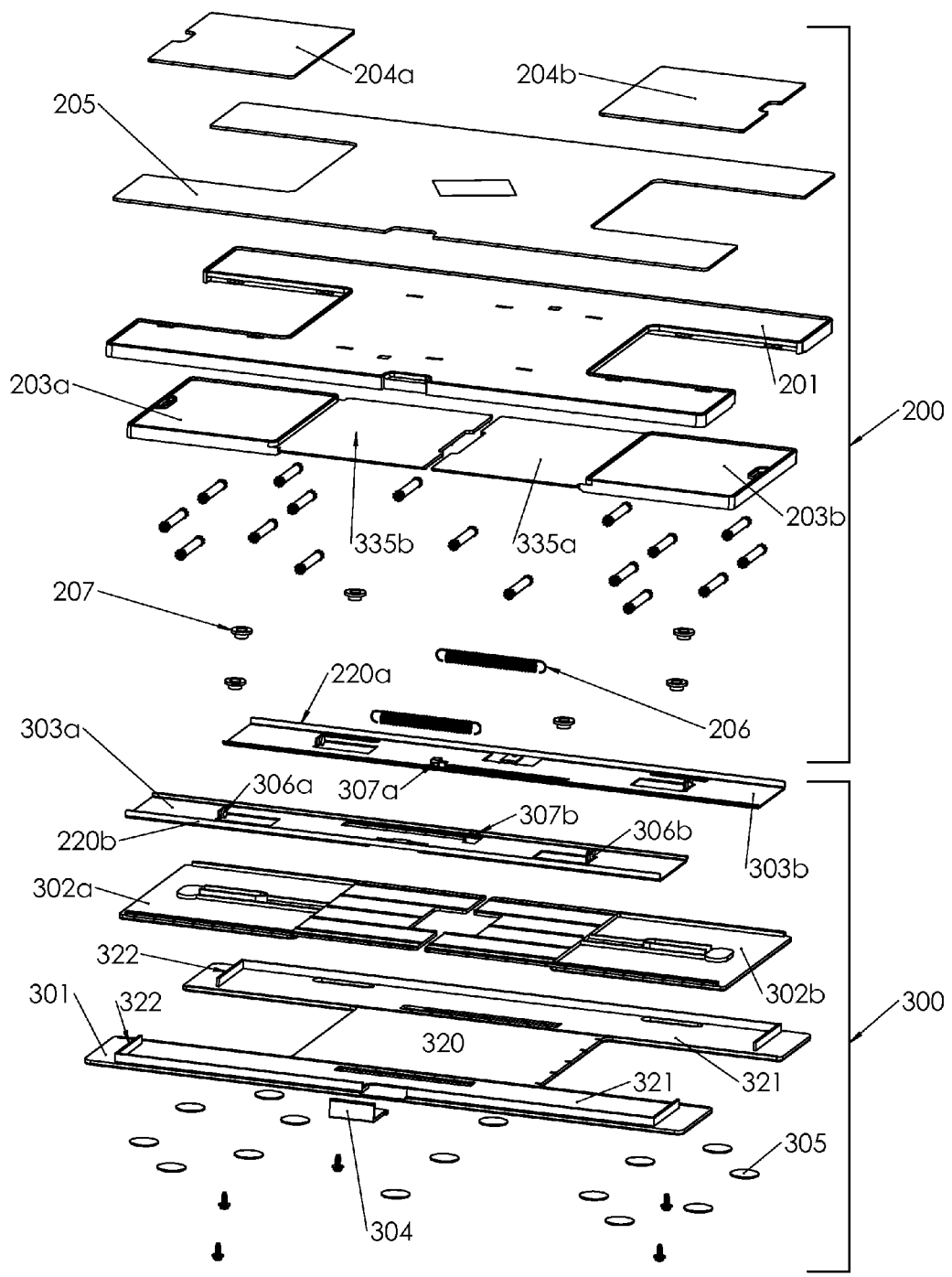
FIG. 13 depicts an exploded view of all of a preferred embodiment of assembly components.

FIG. 13 depicts an exploded view of all of the components of a preferred embodiment. The additional components shown in this view are the platform anti-slip pad 205 and the mouse pad anti-slip pads 204a and 204b. These elastomeric pads provide a high friction "sticky" surface for facilitating a secure no-slide surface for laptops, tablet computers and mobile phones.

FIG. 13 further depicts a plurality of foot pads 305 for attachment to a platform bottom housing 301. A platform bottom housing may comprise a center plan section 320, having a flat planer surface and attached to two rail plane sections 321. Each rail plane section 321 may comprise an outer stiffener 322. Stiffener plates 303(a-b) may retain and guide the mouse pad bottom housings. Each stiffener plate may comprise stop bumpers 306(a-b) and spring anchors 307(a-b).

Springs 206 may have a first end that is attached to a spring anchor 307 of a stiffener plate or other bottom housing member. Lateral guide bearings 207 may be disposed within voids as shown such as lateral tracks 220 and mouse pad lateral tracks 221.

In general, a platform top housing 201 slides or moves along a platform bottom housing 301. The lateral movement between a platform top housing 201 and platform bottom housing 301 provides excellent results in stabilizing or retarding the perceived movement of devices placed upon the platform top housing 201. The lateral movement may be facilitated by use of a variety of systems, including the use of rollers rotating between the platform top housing 201 and platform bottom housing 301. On the top housing portion of FIG. 13 a plurality of rollers 202 may be attached within or upon mouse pad top housings 203(a-b) to roll upon, on or near mouse pad bottom housing 302. The mouse pad top housings 203 may be retained and slide within the platform top housing 201. An optional platform anti-slip pad 205 may be fastened to a top surface of the platform top housing. Optional mouse pad anti-slip pads 204(1-b) may be fastened to the top of each mouse pad.

Figure 14:
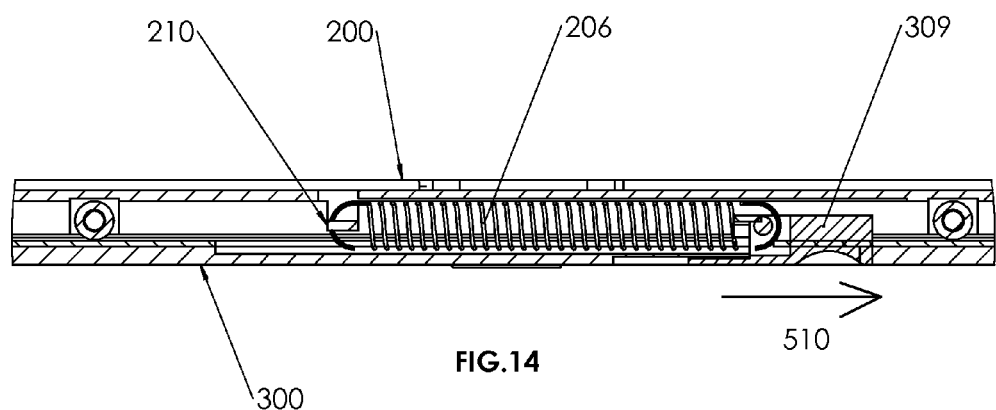
FIG. 14 depicts a front cross sectional view of a platform showing one of the adjustable spring anchors in the right or extended position.

FIG. 14 depicts a front a cross sectional view of an alternative embodiment where spring 206 anchor point 307 in platform bottom housing assembly 300 is replaced by adjustable spring anchor 309. The adjustable spring anchor is user accessible and allows for adjusting and setting the stabilizing spring 206 tension for light weight computers, such as tablet computers, or heavier computers such as laptop computers. This view shows the adjustable spring anchor moved to the right and for use with heavier weight computers. Directional arrow 510 depicts spring movement or spring adjustment to the right to increase spring tension.

Figure 15:
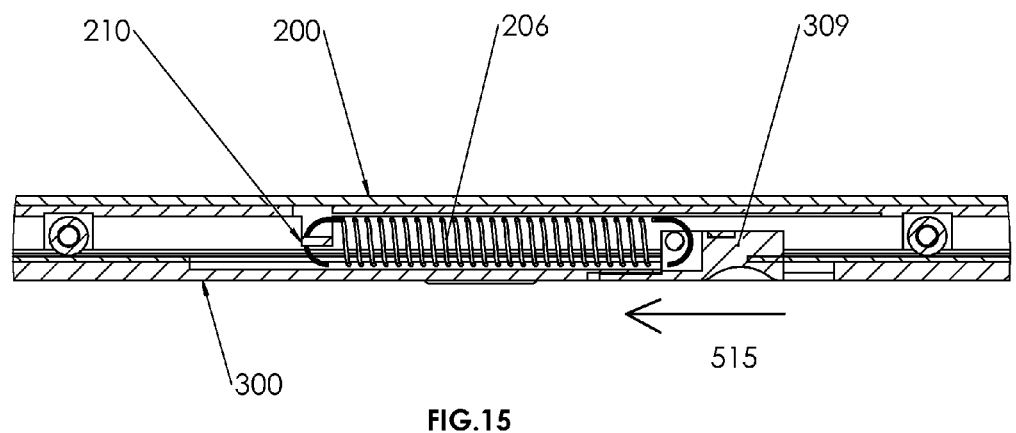
FIG. 15 depicts a front cross sectional view of a platform showing one of the adjustable spring anchors in the left or shortened position.

FIG. 15 depicts the adjustable spring anchor moved to the left and for use with lighter weight computers. Directional arrow 515 depicts spring movement or spring adjustment to the left to decrease spring tension.

Figure 16:
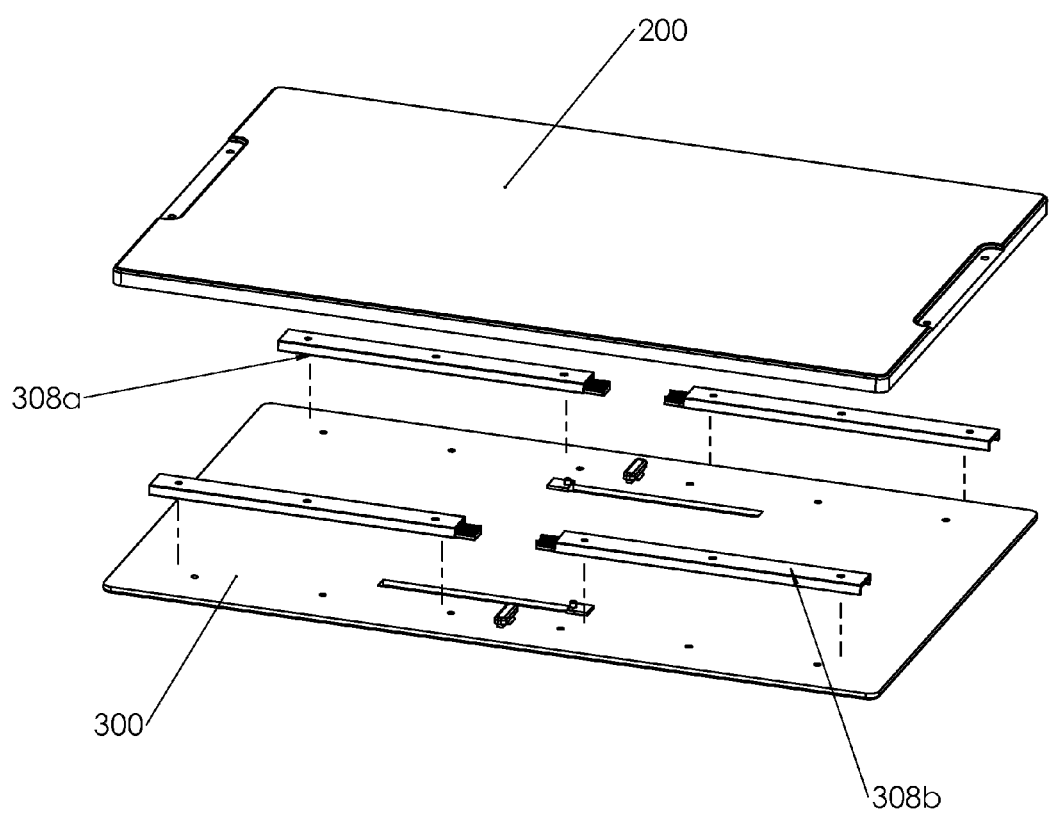
FIG. 16 depicts an exploded top perspective view of an alternate embodiment of the platform showing ball bearing slides in place of rollers.

FIG. 16 depicts an exploded view of an alternative embodiment where rollers 207 are replaced by commercially available ball bearing slides 308. Alternatively, rollers 207 can also be replaced by radial ball bearings or other low friction rolling or sliding components.

Figure 17:
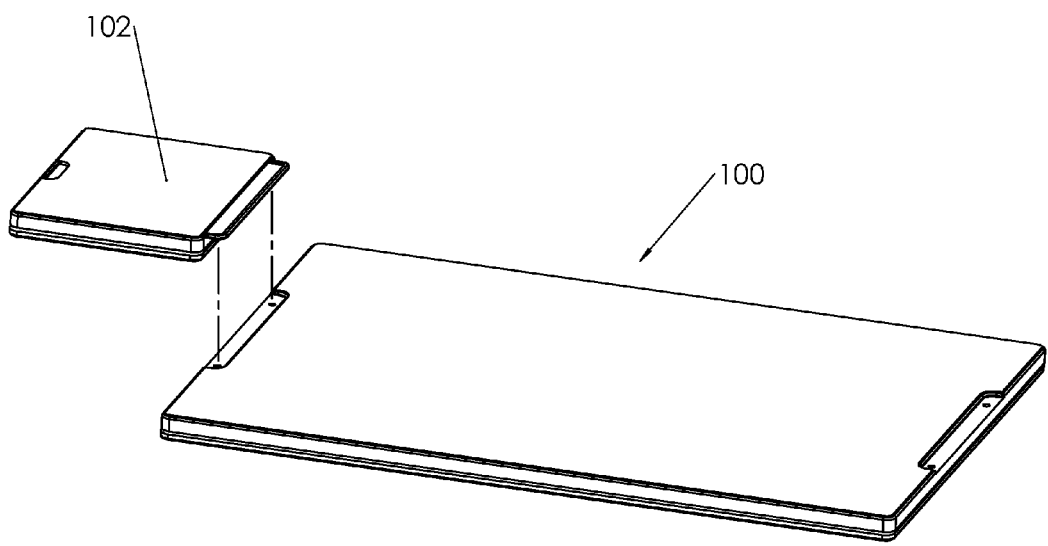
FIG. 17 depicts a top perspective view of an alternate embodiment platform without integrated, extendable mouse pads and a separate attachable mouse pad.

FIG. 17 depicts an alternative embodiment where the platform 100 does not have integrated extendable mouse pads. This view also shows another embodiment option where a detachable mouse pad 102 can be added as an accessory to the platform 100.

Figure 18:
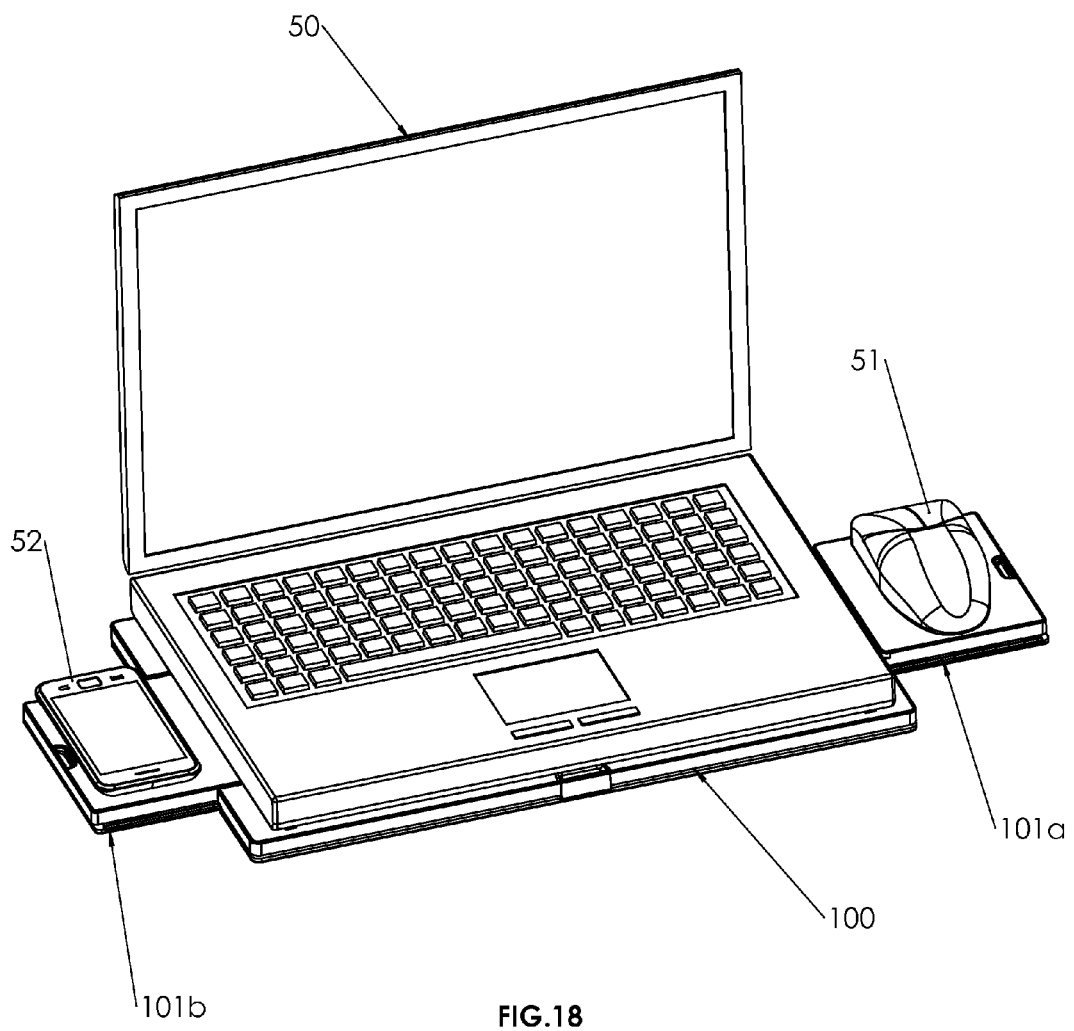
FIG. 18 depicts a top perspective view of a platform with a laptop resting on the platform and the right mouse pad extended with a mouse resting on the top surface and the left mouse pad extended with a mobile phone resting on the top surface.

FIG. 18 depicts a perspective view of a platform 100 with a laptop 50 sitting upon the top surface of the platform and wherein both mouse pads 101a and 101b are extended. The right mouse pad has a computer mouse 51 sitting on the top surface and the left mouse is being used as a stable, non-slip mounting surface for a mobile phone 52.

Figure 19:
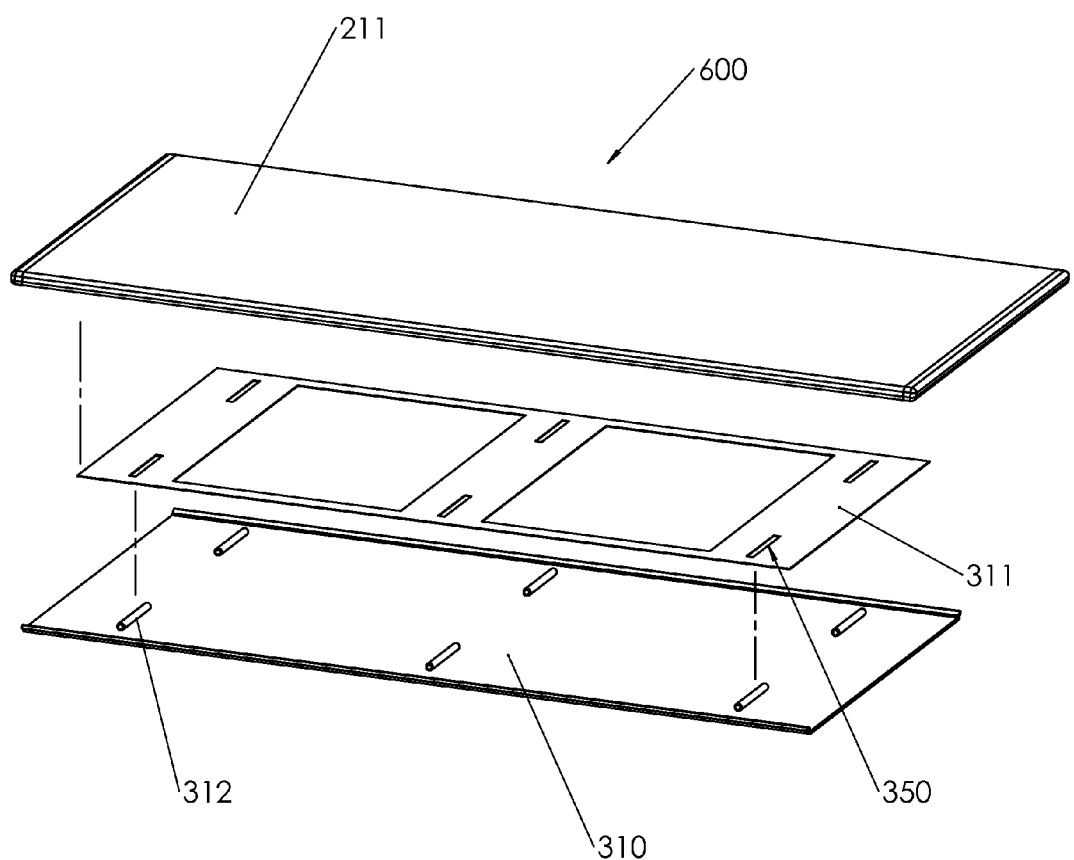
FIG. 19 depicts an exploded top perspective view of an alternative embodiment platform.

FIG. 19 is an exploded view of an alternative embodiment where rollers, which are mounted in roller journals, are replaced by free rollers 312 which are in direct rolling contact with the underside of top housing 211 and the top side of bottom housing 301. Free rollers 312 are guided and separated by guide plate 311. Guide plate 311 acts in the same way that a cage does in a radial ball bearing which guides and separates the balls between the inner and outer races.

Figure 20:
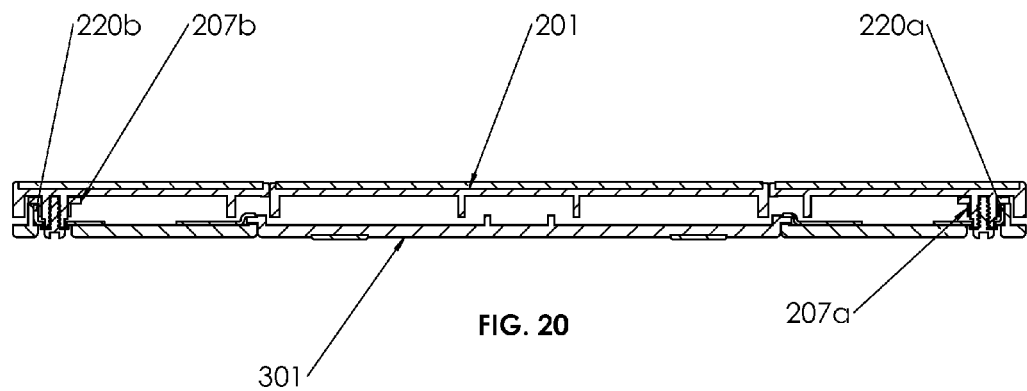
FIG. 20 is a cross section from FIG. 10.

FIG. 20 depicts a sectional view of a lateral guide bearing 207(a-b) contained within a lateral track 220(a-b).

Figure 21:
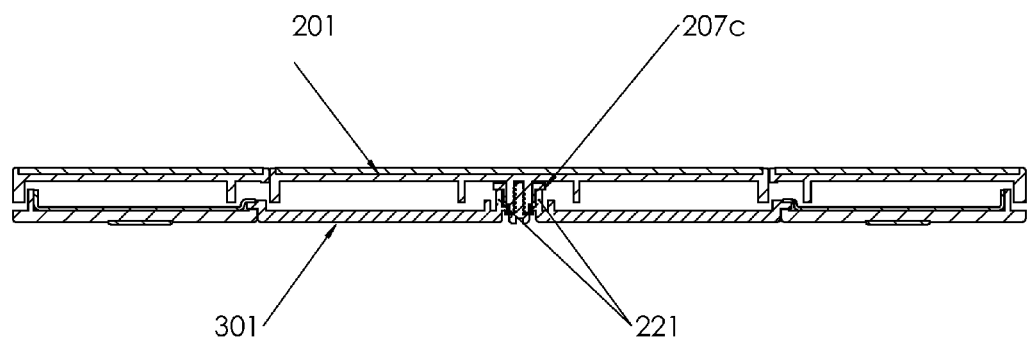
FIG. 21 is a cross section from FIG. 10.

FIG. 21 depicts a sectional view of a lateral guide bearing 207c contained within a mouse pad lateral track 221.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Disclosed embodiments may take the form of the following items:

Item 1. A system for reducing vibration, the system comprising:
   a) top housing assembly comprising a platform top housing, the platform top housing having an upper planer surface and a lower planer surface;
   b) a bottom housing assembly comprising a platform bottom housing comprising an upper planer surface and a lower planer surface;
   c) a plurality of rollers fastened between the lower planer surface of the platform top housing and the upper planer surface of the platform bottom housing.

Item 2. The platform of item 1 wherein the plurality of rollers are rotationally attached to the lower planer surface of the platform top housing.

The platform of item 1 wherein the plurality of rollers are rotationally attached to the upper planer surface of the platform bottom housing.

Item 3. The platform of item 1 wherein the platform top housing further comprises one or more spring anchor points; wherein the platform bottom housing comprises one or more spring anchor points and wherein a spring with a first end is attached to a spring anchor point of the platform top housing and a second end of the spring is attached to a spring anchor point of the platform bottom housing.

Item 5. The platform of item 1 wherein the platform bottom housing comprises a center plane section attached to two rail plane sections.

Item 6. The platform of item 5 wherein the two rail plane sections of the platform bottom housing each comprise a stiffener rib.

Item 7. The platform of item 6 wherein a stiffener plate is disposed upon each of the two rail plane sections and each stiffener plate comprises the stop bumpers, the spring anchor points and the springs.

Item 8. The platform of item 7 wherein one or more mouse pad bottom housings are attached between the stiffener plates and upon the center plane section.

Item 9. The platform of item 8 wherein each mouse pad bottom housing comprises a mouse pad lateral track.

Item 10. The platform of item 9 further comprising a locking latch attached to one or more of the stiffener plates.

Item 11. The platform of item 10 further comprising an adjustable spring anchor attached to each spring.

Item 13. The platform of item 12 wherein the plurality of rollers are attached with roller support journals to the platform top housing.

Item 14. The platform of item 12 wherein a plurality of ball bearings replace the rollers.

Item 15. A platform for reducing vibration, the platform comprising:
   a) a platform top housing assembly comprising a top side and bottom side;
   b) a platform bottom housing assembly comprising a top side and bottom side;
   c) a roller guide floating between the bottom side of the platform top housing assembly and the top side of the platform bottom housing assembly; and
   d) free rollers secured within the roller guide, the free rollers having rotational surfaces in rotational contact with the bottom side of the platform top housing assembly and the top side of the platform bottom housing assembly.

Item 16. The platform of item 15 further comprising one or more springs, with each spring having a first end attached to the platform top housing assembly and a second end attached to the platform bottom housing assembly.

Item 17. The platform of item 17 wherein a plurality of ball bearings replace the free rollers.

What is claimed is:

1. A platform for reducing vibration, the platform comprising:
   a) top housing assembly comprising a platform top housing, the platform top housing having an upper planer surface and a lower planer surface;
   b) a bottom housing assembly comprising a platform bottom housing comprising an upper planer surface and a lower planer surface;
   c) a plurality of smooth rollers fastened between the lower planer surface of the platform top housing and the upper planer surface of the platform bottom housing.

2. The platform of claim 1 wherein the plurality of smooth rollers are rotationally attached to the lower planer surface of the platform top housing.

3. The platform of claim 1 wherein the plurality of smooth rollers are rotationally attached to the upper planer surface of the platform bottom housing.

4. The platform of claim 1 wherein the platform top housing further comprises one or more spring anchor points; wherein the platform bottom housing comprises one or more spring anchor points and wherein a spring with a first end is attached to a spring anchor point of the platform top housing and a second end of the spring is attached to a spring anchor point of the platform bottom housing.

5. The platform of claim 1 wherein the platform bottom housing comprises a center plane section attached to two rail plane sections.

6. The platform of claim 5 wherein the two rail plane sections of the platform bottom housing each comprise a stiffener rib.

7. The platform of claim 6 wherein a stiffener plate is disposed upon each of the two rail plane sections and each stiffener plate comprises a plurality of stop bumpers, the spring anchor points and the springs.

8. The platform of claim 7 wherein one or more mouse pad bottom housings are attached and slide between the stiffener plates and upon the center plane section; and
   wherein each mouse pad bottom housing comprises a mouse pad lateral track, and
   wherein each mouse pad bottom housing comprises a plurality of stiffeners.

9. The platform of claim 8 wherein one or more mouse pad top housings are attached and slide upon the top housing; and wherein each mouse pad top housing comprises a plurality of stiffeners.

10. The platform of claim 9 with a plurality of smooth rollers fastened between a lower planer surface of the mouse pad top housing and an upper planer surface of the mouse pad bottom housing.

11. The platform of claim 9 further comprising a locking latch attached to one or more of the stiffener plates.

12. The platform of claim 10 further comprising an adjustable spring anchor attached to each spring.

13. The platform of claim 12 wherein the plurality of smooth rollers are attached with roller support journals to the platform top housing.

14. The platform of claim 12 wherein a plurality of ball bearings replace the smooth rollers.

\* \* \* \* \*